United States Patent Office 3,539,844
Patented Nov. 10, 1970

3,539,844
ONE-WAY DIRECTIONAL MEANS FOR
SYNCHRONOUS MOTORS
Wallace L. Linn, Indianapolis, Ind., assignor to P. R. Mallory & Co. Inc., Indianapolis, Ind., a corporation of Delaware
Filed Apr. 14, 1969, Ser. No. 815,571
Int. Cl. H02k 7/118
U.S. Cl. 310—41      2 Claims

ABSTRACT OF THE DISCLOSURE

A cam-programming means which is attached to the rotor of a synchronous motor includes at least one arcuate step adapted to engage oppositely disposed pawls pivotally carried by the shell of the motor.

There are a multitude of applications for small synchronous motors of the type having a permanent magnet rotor. Many of these applications are in timing devices such as clocks and automatic washer time sequence switches.

One of the problems associated with synchronous motors having permanent magnet rotors is that the rotors will run in either a clockwise or counterclockwise direction when current is applied. Thus the motor drive shaft could be driven in a direction counter to what is desired. Such indiscriminate turning of the rotor is inherent in the structure of the motor itself. The asymmetry between the magnet, the coil used to energize the magnet, and the relationship of the stator poles inherently causes the rotor to turn in either a clockwise or counterclockwise direction.

The present invention is concerned with synchronous motors of the permanent magnet type and has as one of its objects the provision of a one-way directional means for controlling the direction in which the rotor will run.

Another object of the invention is to provide a one-way directional means for a synchronous motor which will aid the motor in obtaining synchronization at the quickest possible moment.

Another object of the invention is to provide a one-way directional means which is inexpensive, highly efficient, and durable.

A further object of the invention is to provide a one-way directional means for a synchronous motor wherein the direction of the motor output can be readily changed.

Still another object of the invention is to provide a one-way directional means for a synchronous motor which provides for a stop against reverse rotation of the rotor through cooperating cam programming means and stop means.

Another object of the invention is to provide a one-way directional means for a synchronous motor wherein the stop means cooperating with the cam programming means provides a resilient action to aid in quick synchronization of the motor.

A further object of the invention is to provide a one-way directional means for a synchronous motor wherein the cam programming means is carried by the rotor of the motor.

Yet another object of the invention is to provide a one-way directional means for a synchronous motor wherein the stop means are oppositely disposed pawl means pivotally carried by the shell of the motor.

Other objects and the nature thereof will become apparent from the following description considered in conjunction with the accompanying drawings and wherein like reference numbers describe elements of a similar function therein and wherein the scope of the invention is determined by the appended claims.

Figure 1:
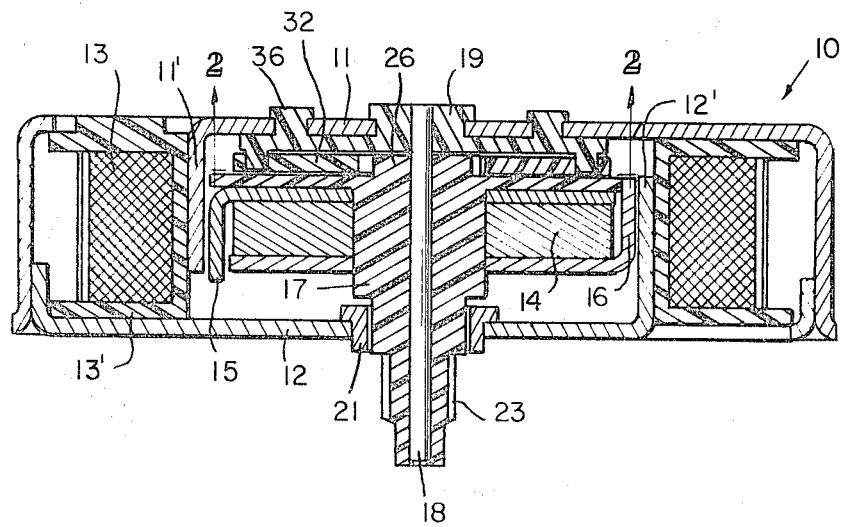
Figure 2:
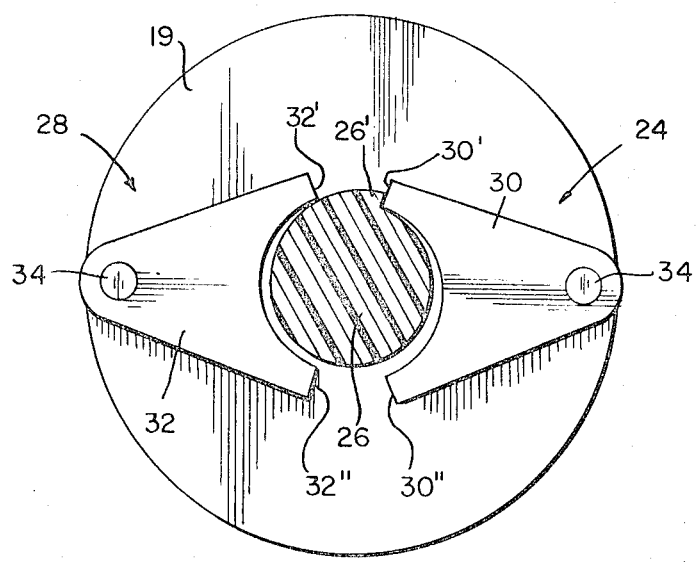

In the drawings:
FIG. 1 is a dead section of a typical synchronous motor employing the novel one-way directional means of the present invention;
FIG. 2 is an enlarged view taken along line 2—2 of FIG. 1 showing the one-way directional means;

Generally speaking, the objects of the invention are accomplished by providing a one-way directional means for a permanent magnet synchronous motor which utilizes a cam programming means adapted to engage stop means so as to prevent further rotation of the rotor of the motor in the wrong direction. More particularly, cam programming means carried by the rotor of the motor cooperates with two oppositely disposed pawls pivotally carried by the shell of the motor such that a quick stop and start from a wrong directional travel of the rotor provides for a quick synchronization of the motor.

Referring now to the drawings, and more particularly to FIG. 1, there is shown a synchronous motor 10 employing the novel one-way directional system of the present invention. The motor includes a top shell 11 and a bottom shell 12 which are held together to form a housing. The material for the shells may be ordinary cold-rolled steel, preferably annealed. A plurality of integral stator poles 11' and 12' are formed by lancing radial strips out of the shells and forming them parallel to the center axis of the motor so as to extend above and below the rim of the shells.

A coil 13 including an insulating spool wound with a predetermined number of turns of wire is annularly disposed in the space between the I.D. of the shells and the intermeshed ring of stator poles through a U-shaped ring 13' made of a suitable plastic to form a bobbin. For illustrative purposes, the coil 13 could have approximately 5000 turns of 40 AWG enameled copper wire terminated by insulated stranded wire.

The rotor of the motor includes a permanent magnet disc 14 sandwiched between two spiders 15 and 16 carried by hub 17 which is press-fitted to a plastic motor drive shaft 18. Each of the spiders have integral legs formed parallel to the center axis of the spiders so as to intermesh alternately with the legs of the opposite spider. The spiders can be formed of ordinary cold-rolled steel, preferably annealed. The permanent magnet disc 14 is magnetized so that one face is north and the opposite face is south. Thus, the spider legs are magnetized correspondingly so that the periphery of the rotor contains a predetermined number of salient rotor poles magnetized alternately north and south.

Drive shaft 18 is rotatably journalled at the top of the motor through bushing 19 and at the bottom of the motor through bushing 21. Pinion gear 23, which as shown is included a part of hub 17, transmits the rotation of the drive shaft to a load (not shown). It should be understood, that the motor is energized by connecting the motor to a suitable power source through electrical leads (not shown).

As noted previously, when the motor is first started, the rotor can "take off" in either a clockwise or counterclockwise direction due to the asymmetry between the coil, the magnet and the stator and rotor poles. In the present invention, this problem has been solved by the one-way directional means 24. One-way directional means 24, in general, includes a cam programming means 26 carried by the rotor of the motor and stop means 28. The cam programming means includes at least one arcuate step 26'. It is formed as part of the hub 17. However, it should be understood that it need not be so formed, but could be a separate element connected to or carried by the rotor. By being connected to the rotor a more quick, positive response to the wrong-way travel of the rotor is achieved. In addition, the mass or energy of the rotor is used to quickly reverse or start the rotor in the desired direction.

Stop means 28 includes a pair of oppositely disposed pawls 30 and 32 pivotally carried by a shell of the motor. The pawls are coupled to bushing 19 through bosses 34, the bushing 19 in turn being staked to the shell 11 through bosses 36. Included as part of each pawl is a stop face 30', 30" and 32' and 32". As shown, arcuate step 26' is adapted to mate either stop face 30' or 32". As will be hereinafter described, stop faces 32' and 30" are adapted to engage step 26' when it is desired to have the motor running in a rotational direction opposite from what the configuration shown will produce.

In operation, when coil 3 is energized the rotor will turn in either a clockwise or counterclockwise direction FIG. 2 illustrates an embodiment of the invention wherein the motor is designed such that the rotor desirably turns in a counterclockwise direction when the motor is in operation. Should the rotor "take off" in a clockwise direction, arcuate step 26' will engage either of stop faces 30' or 32". Thus if step 26' is disposed past face 32" as the rotor turns clockwise, step 26' will engage stop face 30', while if step 26' is disposed short of stop face 32" as the rotor turns clockwise, step 26' will engage face 32". When the step engages one of the faces, the rotor will be stopped from its wrong direction travel and in addition, because the cam programming means is connected to the rotor, the mass of the rotor and its stored energy will assure a quick positive start in the right direction. Thus the one-way directional system of the present invention not only prevents incorrect rotation of the rotor, but it aids in the quick synchronization of the rotor in the proper direction. As the rotor turns in the proper direction the arcuate step 26' rides over the stop faces.

Where it is desired that the motor turn in a clockwise direction and the motor starts in a counterclockwise direction, the cam programming means would be a mirror image (step 26' biased in the opposite direction) and the step 26' would engage either face 32' or 30".

From the foregoing description taken in conjunction with the accompanying figures of the drawing, it will be readily apparent to those skilled in the art that this invention provides a new and improved one-way directional system for synchronous motors.

What is claimed is:

1. In a synchronous motor, a shaft, a rotor including a hub portion carried by said shaft, a shell at least partially enclosing said rotor, a bushing carried by said shell, said shaft journalled in said bushing, a one-way directional means comprising cam programming means included as part of said hub, a pair of oppositely disposed pawl means pivotally carried by said bushing, said pawls cooperating with said cam programming means to stop said motor from a wrong-way directional travel.

2. In a synchronous motor according to claim 1 wherein each of said pawls includes two stop faces.

References Cited

UNITED STATES PATENTS

| 3,307,056 | 2/1967 | Woolley | 310—41 |
| 3,448,308 | 6/1969 | Pervorse et al. | 310—41 |

FOREIGN PATENTS

| 1,460,560 | 10/1966 | France. |
| 550,809 | 1/1943 | Great Britain. |
| 1,022,900 | 3/1966 | Great Britain. |

W. E. RAY, Primary Examiner